(12) United States Patent
Adkins et al.

(10) Patent No.: US 7,472,138 B2
(45) Date of Patent: Dec. 30, 2008

(54) SYSTEM AND METHOD FOR HANDING INPUT/OUTPUT ERRORS DURING RECOVERY OF JOURNALING FILES IN A DATA PROCESSING SYSTEM

(75) Inventors: Janet Elizabeth Adkins, Austin, TX (US); Joon Chang, Austin, TX (US); Ashley D. Lai, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 11/011,242

(22) Filed: Dec. 14, 2004

(65) Prior Publication Data

US 2006/0129611 A1 Jun. 15, 2006

(51) Int. Cl.
*G06F 12/00* (2006.01)

(52) U.S. Cl. .................. 707/202; 707/200; 707/204; 714/1; 714/15; 714/16; 714/19; 714/20

(58) Field of Classification Search .................. None
See application file for complete search history.

(56) References Cited

U.S. PATENT DOCUMENTS

| | | | | | |
|---|---|---|---|---|---|
| 4,507,751 | A | * | 3/1985 | Gawlick et al. | 707/202 |
| 5,043,871 | A | * | 8/1991 | Nishigaki et al. | 707/202 |
| 5,086,502 | A | * | 2/1992 | Malcolm | 714/8 |
| 5,684,991 | A | * | 11/1997 | Malcolm | 707/204 |
| 6,122,629 | A | * | 9/2000 | Walker et al. | 707/8 |
| 6,286,011 | B1 | * | 9/2001 | Velamuri et al. | 707/104.1 |
| 6,714,951 | B2 | * | 3/2004 | Bills et al. | 707/202 |
| 6,996,580 | B2 | * | 2/2006 | Bae et al. | 707/200 |
| 2004/0153923 | A1 | * | 8/2004 | Goel et al. | 714/724 |
| 2004/0225689 | A1 | * | 11/2004 | Dettinger et al. | 707/200 |
| 2005/0210073 | A1 | * | 9/2005 | Oeda et al. | 707/200 |
| 2006/0259940 | A1 | * | 11/2006 | Schaefer et al. | 726/1 |
| 2006/0259949 | A1 | * | 11/2006 | Schaefer et al. | 726/1 |
| 2008/0155548 | A1 | * | 6/2008 | Dettinger et al. | 718/102 |

OTHER PUBLICATIONS

Adkins et al., "Method and Apparatus for File System Snapshot Persistence", US Utility Patent Application, Filed Feb. 12, 2004, 42 pages.
Chang et al., "Method and Apparatus for Ensuring Valid Journaled File System Metadata During a Backup Operation", US Utility Patent Application, Filed Oct. 9, 2003, 44 pages.

(Continued)

*Primary Examiner*—Tim Vo
*Assistant Examiner*—Hubert Cheung
(74) *Attorney, Agent, or Firm*—Dillon & Yudell LLP (57) ABSTRACT

A system and method in a data processing system for recovering data in a file system. A request to modify a data block in the file system is detected. In response to detecting the request to modify the data block, metadata describing the data block in the file system is written in a log. In response to detecting an error during the writing of the metadata, an error counter is incremented. Finally, in response to a request to recover the data in the file system, the metadata is read only if the error counter is less than or equal to a predetermined value.

12 Claims, 8 Drawing Sheets

OTHER PUBLICATIONS

Shaffer, JJ, "Generating Sympton Strings for AIX System Dumps", IBM Confidential Disclosure, date printed: Sep. 1, 2004, vol. 38, n10, 10-95, p. 219-220, Austin, Texas.

Duvall et al., "Database Server Journaling Recursion Heuristic", IBM Confidential Disclosure, date printed Sep. 1, 2004, vol. 36, n2, p. 13-14, Boulder, CO.

Levine, PE, "Page Inconsistency Recovery and Avoidance", IBM Confidential Disclosure, Mar. 1989, Research Disclosure No. n299 03-89, Austin, Texas.

Duvall et al., "Database Server Journal Backup Automation Technique", IBM Confidential Disclosure, date printed Sep. 1, 2004, vol. 36, n2 02-93 p. 463-464, Austin, Texas.

* cited by examiner

SYSTEM AND METHOD FOR HANDING INPUT/OUTPUT ERRORS DURING RECOVERY OF JOURNALING FILES IN A DATA PROCESSING SYSTEM

BACKGROUND OF THE INVENTION

1. Technical Field

The present invention relates in general to data processing systems. More particularly, the present invention relates to storage systems implemented within data processing systems. Still more particularly, the present invention relates to recovering data from a data processing system.

2. Description of the Related Art

Almost all computer systems require some sort of storage capacity. This storage capacity can be used for storing computer code for applications, utilities, and operating systems, or data processed by an application program.

Relatively early in the development of computer systems, disk drives became a fundamental device for storage. Accordingly, most computer systems rely on a file system for storing and retrieving files from a disk. The file system defines the directory structure for keeping track of the files and the path syntax required to access the files. The file system also defines the way files are named and the maximum file size of the file or volume. A file system generally consists of two distinct parts, a collection of files and a directory structure. The directory structure organizes and provides information about the files in the file system.

Some of the greatest difficulties concerning file systems relate to corruption and errors as a result of system crashes or write errors to the disk drive. Before data is written to a storage system, data is usually sent to a disk cache. The disk cache is a buffer allocated in the main memory and is intended to increase the speed of input/output (I/O) operations by permitting rapid temporary storage of data while awaiting disk access for write operations or by caching data which is expected to be requested prior to receipt of a read request. Problems occur when there is a system crash or failure before the data in the disk buffer has been written to the physical disk. In this case, upon reboot of the system, the system will operate in an inconsistent manner, since the system believes that the data has been written to the disk drive but, in actuality, the data has not been written to the disk drive due to the system failure. For example, a file may be deleted in the disk cache, but this deletion may not have actually been performed on the physical disk and the file still remains on the physical disk.

When a file system inconsistency is encountered, a well-known solution is to utilize a file system check program, such as fsck in Unix-based environments and Scandisk in Microsoft WINDOWS environments. Generally, a file system check program is run automatically at boot time when the system detects that a file system is in an inconsistent state, indicating a less than graceful shutdown, such as a crash or power loss. Typically, file system check program utilities provide options for interactively repairing damaged file systems (the user must decide how to fix specific problems), allowing the file system check program to decide how to fix specific problems (so the user does not have to answer any questions), or reviewing the problems that need to be resolved on a file system without actually fixing them. While file system check programs provide the user with a useful tool for repairing file systems damaged by a system crash or other types of abnormal system shutdowns, the time required to run the programs can be extensive, especially with today's high-capacity disk drives.

To solve this problem, journaling systems, which are well-known in the art, not only log every transaction on the metadata into a log, but log every single operation within each transaction. In the event of a system failure, the system merely has to access the log file and perform a recovery operation to return the file system to a consistent state.

Despite the implementation of journaling systems, file systems may still encounter errors when writing to the journal log. In the past, an error encountered when writing to a log of a journaling system results in the loss of all the log data and subsequent loss of more file system metadata. Therefore, there is a need for a system and method for recovering from errors generated while writing to and reading from a journaling file system log file.

SUMMARY OF THE INVENTION

The present invention provides a system and method for recovering data in a file system. According to a preferred embodiment of the present invention, each request to modify a data block in the file system is detected by a journaling manager. In response to detecting the request to modify the data block, metadata describing the data block in the file system is written in a log by the journaling manager. An error counter is then incremented, in response to detection of an error during the writing of the metadata. In response to a request to recover the data in the file system, the journal recovery manager allows metadata to be read only if the error counter is less than or equal to a predetermined value. In the past, any error that occurs during the writing of metadata to the log by the journaling manager results in the loss of the log for data recovery purposes. The present invention allows for the recovery of as much logged metadata as possible, provided that the error counter is less than or equal to a predetermined value, thus ensuring a more rapid recovery of data on a file system.

These and other features and advantages of the present invention will be described in, or will become apparent to those of ordinary skill in the art in view of the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying figures, wherein:

DETAILED DESCRIPTION OF THE PREFERRED EMBODIMENT

Figure 1:
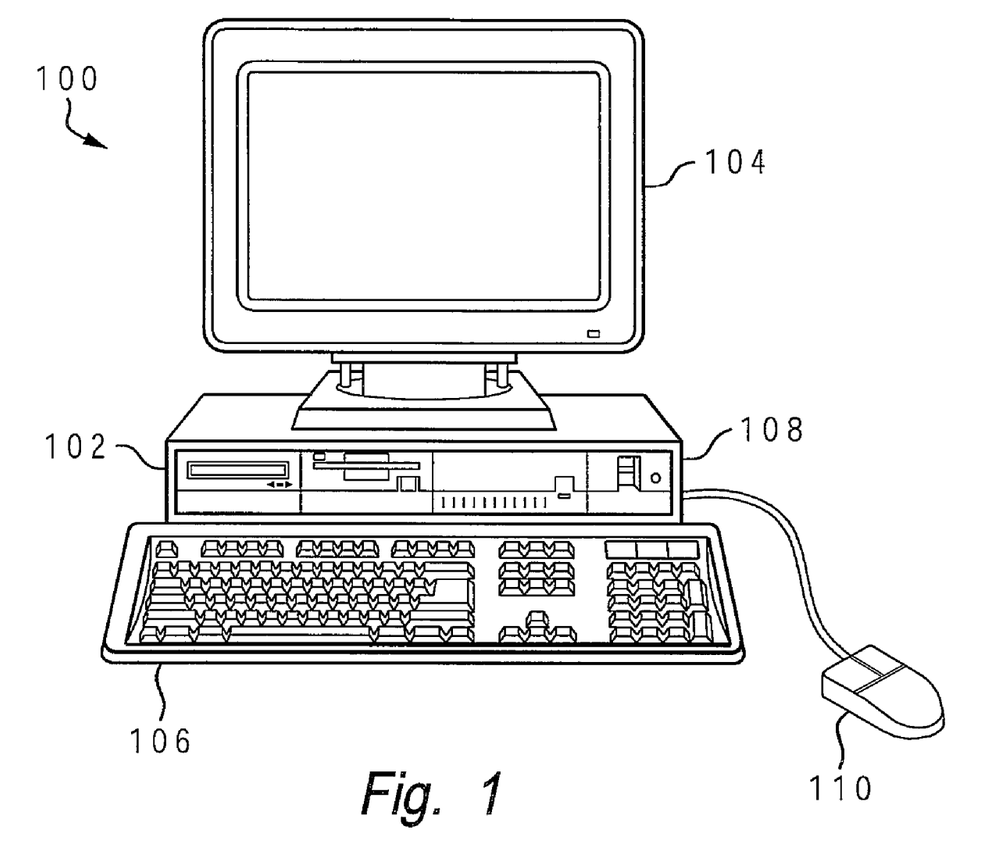
FIG. 1 depicts a data processing system in which a preferred embodiment of the present invention may be implemented.

With reference now to the figures, and in particular, with reference to FIG. 1, there is depicted a pictorial representation of a data processing system in which the present invention may be implemented in accordance with a preferred embodiment. A computer 100, which includes system unit 102, display 104, keyboard 106, storage devices 108, which may include floppy drives and other types of permanent and removable storage media, and mouse 110, is illustrated. Additional input devices may be included with computer 100, such as, for example, a joystick, touchpad, touch screen, trackball, microphone, and other peripherals. Computer 100 can be implemented using any suitable computer, such as an IBM ESERVER computer or INTELLISTATION computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of system software residing in computer readable media in operation with computer 100.

Figure 2:
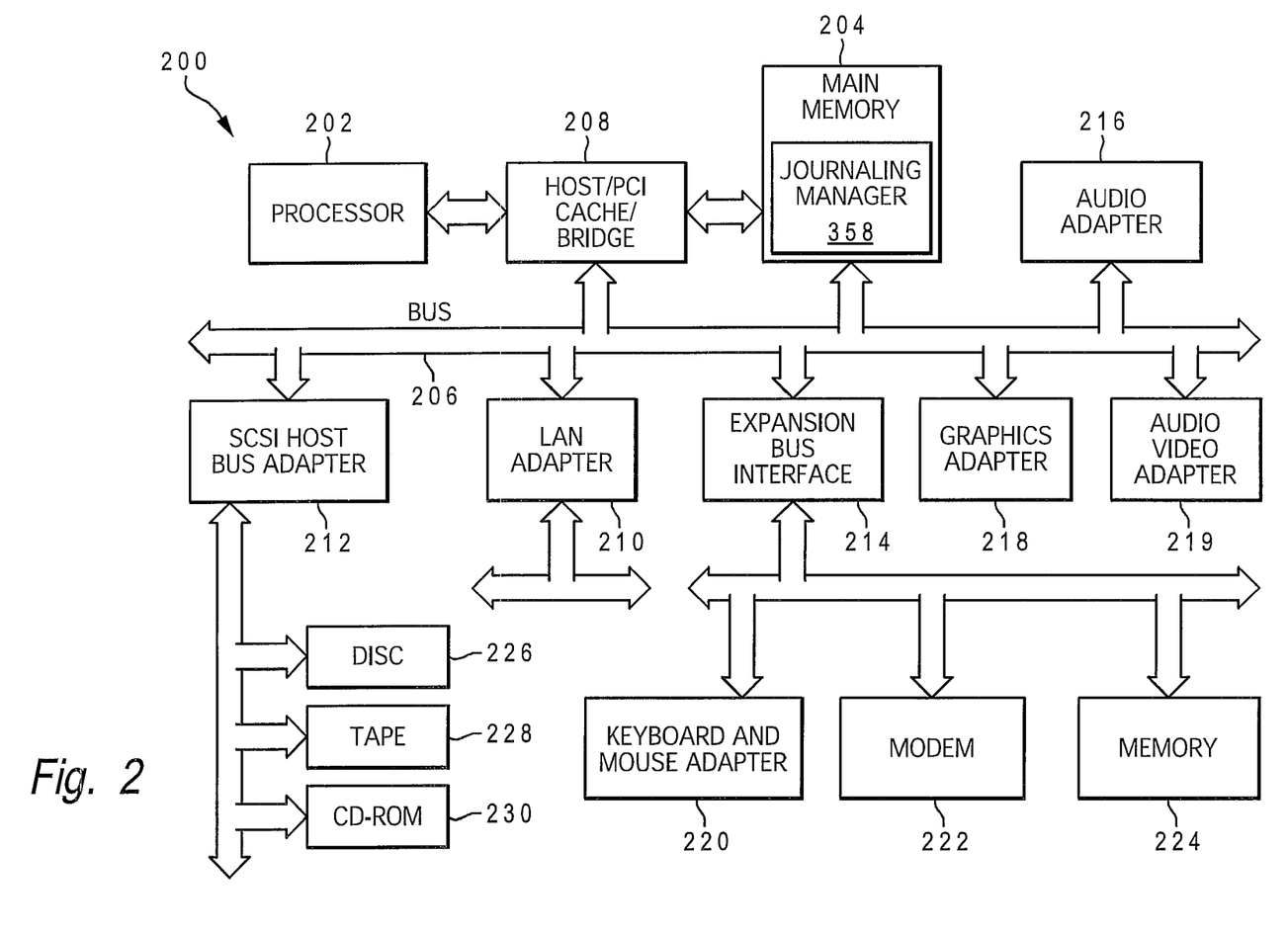
FIG. 2 illustrates a block diagram of a data processing system according to a preferred embodiment of the present invention.

With reference now to FIG. 2, a block diagram of a data processing system is illustrated in which a preferred embodiment of the present invention may be implemented. Data processing system 200 is an example of a computer, such as computer 100 in FIG. 1, in which code or instructions implementing the processes of the present invention may be located. Data processing system 200 preferably employs a peripheral component interconnect (PCI) local bus architecture. Although the depicted example employs a PCI bus, other bus architectures such as Accelerated Graphics Port (AGP) and Industry Standard Architecture (ISA) may be utilized. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the illustrated example, local area network (LAN) adapter 210, small computer system interface SCSI host bus adapter 212, and expansion bus interface 214 provide a connection for a keyboard and mouse adapter 220, modem 222, and additional memory 224.

Figure 3A:
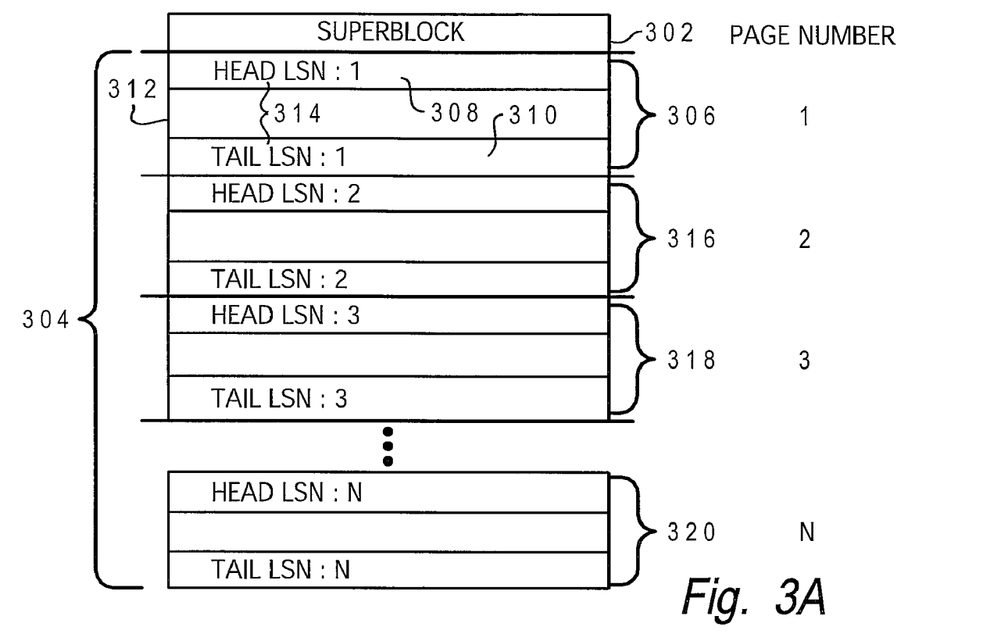
FIG. 3A depicts a block diagram of a journaling log file during initialization according to a preferred embodiment of the present invention.
Figure 3B:
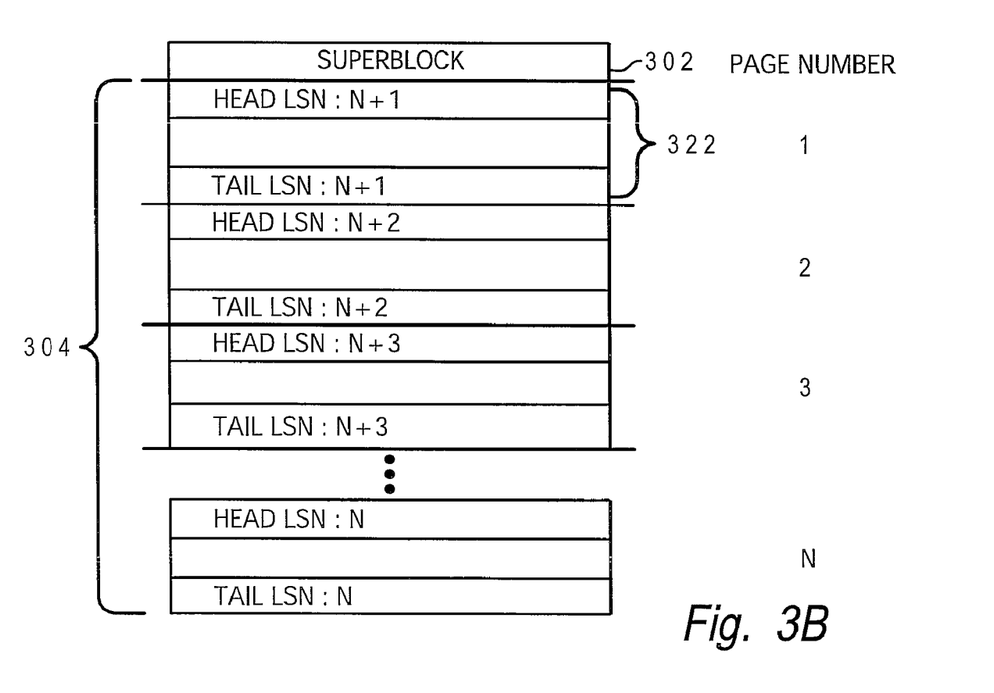
FIG. 3B illustrates a block diagram of a journaling log file during runtime according to a preferred embodiment of the present invention.
Figure 3C:
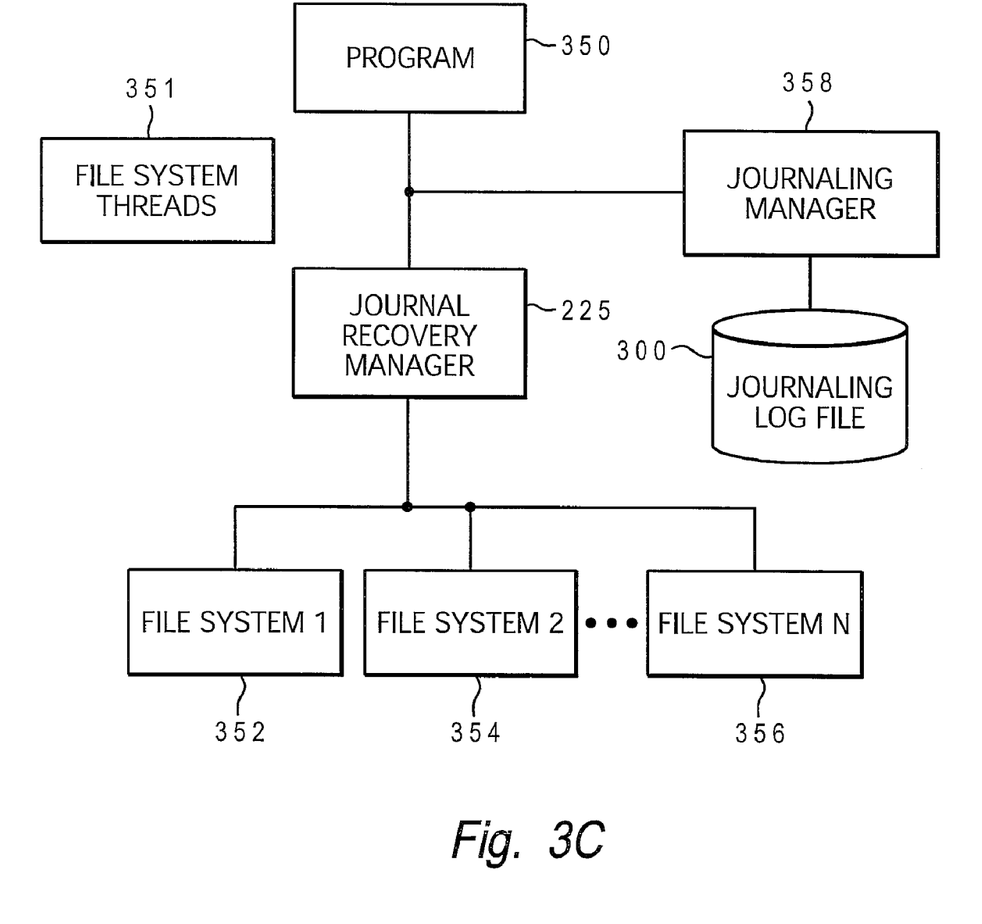
FIG. 3C depicts a block diagram of the relationship between a journal recovery manager, a journaling manager, a journaling log file, and at least one file system according to a preferred embodiment of the present invention.

Referring to FIGS. 2 and 3C, journaling manager 358 (discussed in detail below), resident in main memory 204, works in concert with journal recovery manager 225, journaling log file (log) 300, and file systems 352, 354, and 356 to enable recovery of data stored in a hard disk drive 226. SCSI host bus adapter 212 preferably provides connection for hard disk drive 226, tape drive 228, and CD-ROM drive 230. Typical PCI local bus implementations will support three or four PCI expansion slots or add-in connectors.

Those skilled in the art will appreciate that journaling manager 358 may be implemented as a computer program product that is resident in main memory 204, additional memory 224, hard disk drive 226, tape drive 228, or CD-ROM 230. Journaling manager 358 may also be located in a remote location and accessed by data processing system 200 via LAN adapter 210, modem 222, or other network means. Also, journaling manager 358 may also be implemented as a hardware circuit that is coupled to data processing system 200 or to a remote location that may be accessed by data processing system 200 via LAN adapter 210, modem 222, or other network means.

An operating system runs on processor 202 and is utilized to coordinate and provide control of various components within data processing system 200 of FIG. 2. The operating system may be a commercially available operating system such as WINDOWS XP, which is available from Microsoft Corporation. An object-oriented programming system such as JAVA may run in conjunction with the operating system and provides calls to the operating system from JAVA programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on a particular implementation. Other internal hardware or peripheral devices, such as flash read-only memory (ROM), equivalent non-volatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In such case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user generated data.

The depicted example in FIG. 2 and above-described examples are not meant to imply architectural limitations. For example, data processing system 200 also may be a notebook computer or hand-held computer, in addition to taking the form of a PDA. Data processing system 200 also may be a kiosk or a Web appliance.

The processes of the present invention are performed by processor 202 utilizing computer implemented instructions, which may be located in a memory such as, for example, main memory 204, memory 224, or in one or more peripheral devices 226,228 and 230.

Referring to FIG. 3A, there is depicted a block diagram of a journaling log file (log) 300 during initialization in accordance with one preferred embodiment of the present invention. Superblock 302 stores a variety of information describing the contents of journaling log file 300. For example, superblock 302 may store information indicating the size of journaling log file 302, the state of the log (e.g. whether or not the log has too many errors to be utilized in data recovery), and list of file systems currently utilizing journaling log file 302, known as "active file systems". List 304 includes the actual metadata written to the log. For example, page 306 includes head 308, tail 310, and body 312. Head 308 and tail 310 both include log sequence number (LSN) 314 that indicates the location of page 306 in list 304. When metadata is written to page 306, Log sequence number 314 is written both to head 308 and tail 310. Then, the metadata is written to body 312. During the recovery operation outlined in FIGS. 5A and 5B, page 306 may be examined to determine whether or not it should be utilized in data recovery. A log sequence number 314 in head 308 is compared with log sequence number 314 in tail 310. If the particular log sequence number in head 308 does not match the log sequence number in tail 310, this indicates that the writing of journaling data to body 312 was not complete and that particular page should not be used for recovery purposes. Pages 316, 318, and 320 operate in an identical manner.

With reference to FIG. 3B, there is illustrated a block diagram of journaling log file 300 during runtime, in accordance with one preferred embodiment of the present invention. The description of the journaling log file 300 during runtime is similar to the description of the journaling log file at initialization in FIG. 3A. However, as illustrated in FIG. 3B, when the maximum number of entries (N) of journaling log file 300 is exceeded, the next entry overwrites the earliest entry in the journaling log file. Also, the log sequence number written in the head and tail of the new entry is equal to N+1. For example, on the first wraparound of journaling log file 300, the entry with log sequence number equal to 1 is replaced with an entry with a new log sequence number of N+1, as depicted on page 322.

Referring to FIG. 3C, there is depicted a block diagram of the relationship between a program 350, journal recovery manager 225, journaling manager 358, journaling log file 300, at least one set of file system threads 351, and at least one file system 352, 354, and 356. In accordance with one embodiment of the present invention, program 350, journal recovery manager 225, and journaling manager 358, and file system threads 351 reside in memory 204, while file systems 352, 354, and 356 reside in disk drive 226. As depicted, program 350 and journal recovery manager 225 are features that the user of data processing system 200 may interact with, while file system threads 351, journaling manager 358, journaling log file 300, and file systems 352, 354, and 356 are controlled by the operating system kernel.

Typically, a kernel (or any comparable center of an operating system) includes an interrupt handler that handles all requests or completed I/O operations that compete for the kernel's services, a scheduler that determines which programs share the kernel's processing time in what order, and a supervisor that actually gives use of the computer to each process when it is scheduled. A kernel may also include a manager of the operating system's address spaces in memory or storage, sharing these among all components and other users of the kernel's services. A kernel's services are requested by other parts of the operating system or by application programs through a specified set of program interfaces sometimes known as system calls.

Returning to FIG. 3C, the various parts of the system are coupled by an interconnect, such as PCI local bus 206. During operation, program 350 seeks to modify a data block residing in at least one of the file systems 352, 354, and 356 via at least one of the set of file system threads 351. Metadata describing the data block is written to journaling log file 300 by journaling manager 358. Journaling manager 358 determines whether or not an error occurred during the writing of the metadata. If an error occurs during the writing of the metadata, journaling manager 358 increments an error counter. Journaling manager 358 examines the error counter and compares it to a predetermined value, such as a high water mark. If the error counter is equal to or exceeds the high water mark, journaling manager 358 determines that journaling log file 300 should not be utilized in metadata recovery. If the error counter is less than the high water mark, journaling manager 358 allows journaling log file 300 to be utilized in metadata recovery in at least one of file systems 352, 354, or 356, on receipt of a request for metadata recovery.

Figure 4A:
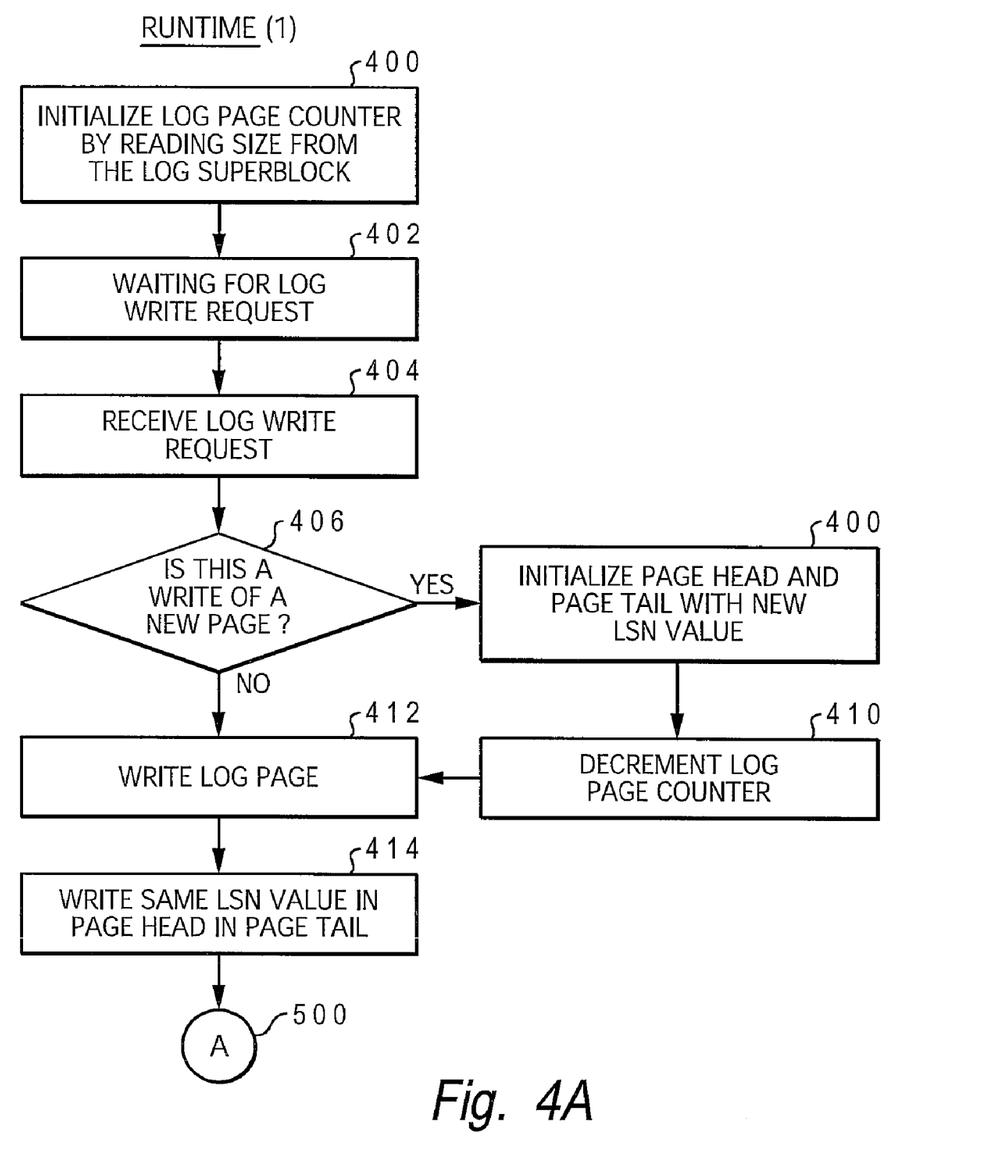
FIG. 4A illustrates the first part of a high-level flowchart diagram of the runtime operation of the present invention according to a preferred embodiment.

With reference to FIG. 4A, there is illustrated a high-level flowchart diagram of the runtime operation of one preferred embodiment of the present invention. The process begins at step 400, which illustrates the log page counter being initialized by reading the size of log 300 from superblock 302. The log page counter indicates how many additional pages may be written to the log before wrapping back to the beginning of the log. For example, assume a formatted (e.g. blank) log with a page capacity of N. At the first write of a new page to log 300, the log page counter would decrement to N−1, which indicates that there are N−1 more spaces available in the log 300 for new pages.

Referring back to FIG. 4A, the process then continues to step 402, which illustrates that journal recovery manager 225 and journaling manager 358 waiting for a log write request. Then, as depicted in step 404, journal recovery manager 225 and journaling manager 358 receive a log write request. Typically, some objects in the file system are earmarked so that whenever the earmarked objects are modified, a log write request is sent. Then, as illustrated in step 406, a determination is made as to whether or not the present log write request is a request to write a new page into log 300. If it is determined that the present log write request is a write of a new page, the process continues to step 408, which depicts the page head 308 and page tail 310 records being initialized with a new log sequence number (LSN) value. The process then continues to step 410, which illustrates that the log page counter is decremented. Then, the process proceeds to step 412, which depicts the log page being written. Then, after the log page is written in log 300, the process continues to step 500, which illustrates the beginning step of the second part of the runtime high-level flowchart diagram.

With reference back to step 406, if it is determined that the current log write request is not a write of a new page, the process continues to step 412, which illustrates the writing of the log page. Finally, the process continues to step 500, which depicts the beginning of the second part of the runtime high-level flowchart (FIG. 4B).

Figure 4B:
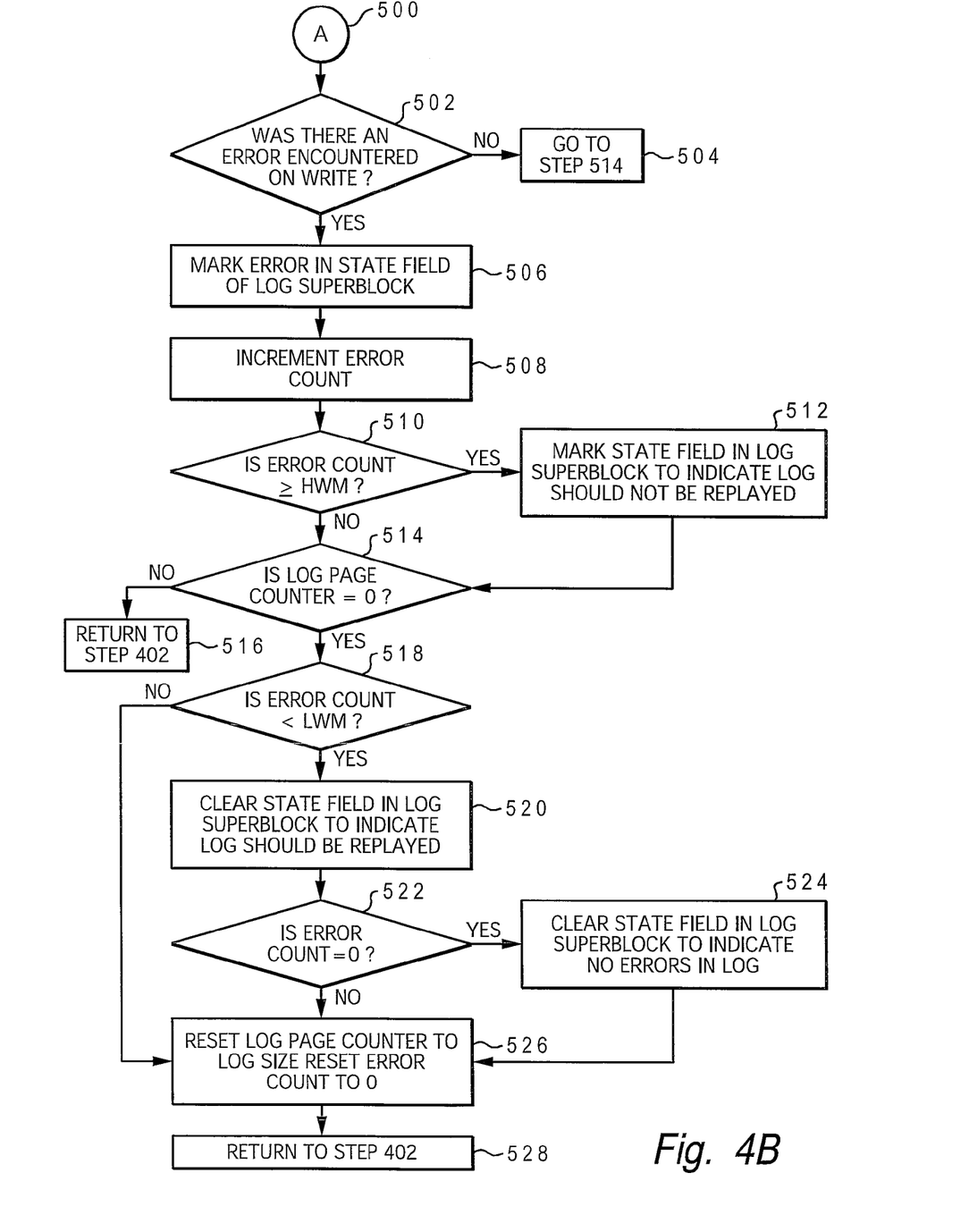
FIG. 4B depicts the second part of a high-level flowchart diagram of the runtime operation of the present invention according to a preferred embodiment.

Referring to FIG. 4B, there is depicted a high-level flowchart diagram of the runtime operation of one preferred embodiment of the present invention. As previously addressed, the process continues from step 500 (from FIG. 4A) and proceeds to step 502, which illustrates a determination made as to whether or not there was an error encountered on the write to log 300. If it is determined that no error occurred on the write to log 300, the process continues to step 504, which illustrates the process continuing to step 514, and proceeds in an iterative fashion. If, however, it is determined that an error was encountered on the write to log 300, the process continues to step 506, which depicts an error being marked in the state field of superblock 302. The process then continues to step 508, which illustrates the error count being incremented. Then, as depicted in step 510, there is a determination made as to whether or not the error count is greater than or equal to the high water mark (HWM). If it is determined that the error count is greater than or equal to the high water mark, the process continues to step 512, which illustrates a mark being made in the state field in superblock 302 to indicate that log 300 should not be replayed. Then, the process continues to step 514.

If it is determined that the error count is not greater than or equal to the high water mark, the process continues to step 514, which illustrates the making of a determination as to whether or not the log page counter is equal to zero. If the log page counter is determined to not be equal to zero, the process continues to step 516, where it is indicated that the process returns to step 402 and proceeds in an iterative fashion. If the log page counter is determined to be equal to zero, the process moves to step 518, which depicts a determination made as to whether or not the error count is less than the low water mark, as illustrated. If it is determined that the error count is less than the low water mark, the process continues to step 520, which depicts the state field in superblock 302 being cleared to indicate that log 300 should be replayed. If it is determined that error count is not less than the low water mark, then the process continues to step 526, which illustrates the log page counter being reset to the log size and the error count being reset to zero. In step 522, there is depicted a determination made as to whether or not error count is equal to zero. If error count is determined to be equal to zero, the process moves to step 524, which illustrates the state field in superblock 302 being cleared to indicate that there are no errors in log 300. Then, the process continues to step 526. Finally, after step 526, step 528 depicts the process returning to step 402 and proceeding in an iterative fashion.

Figure 5A:
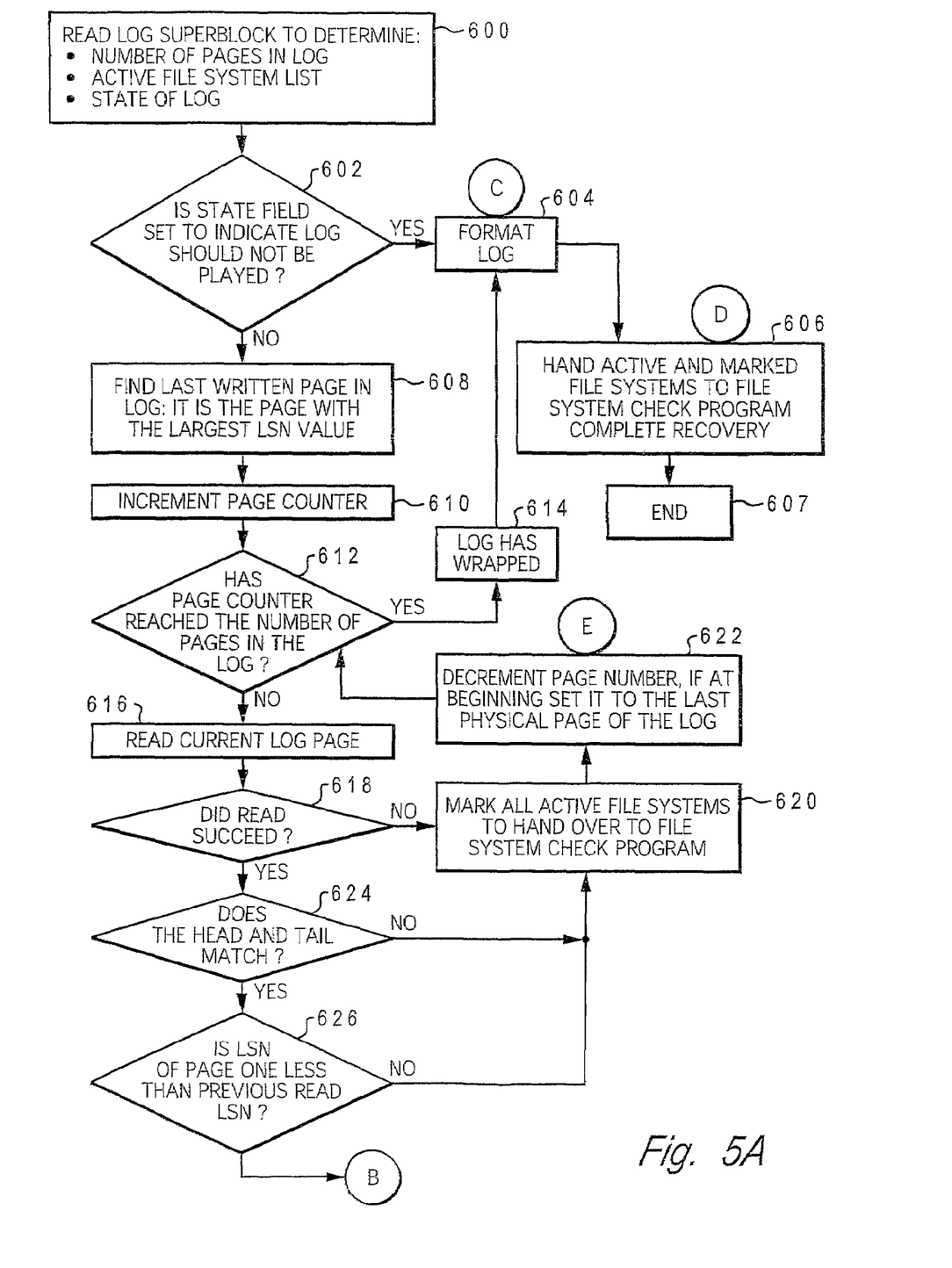
FIG. 5A illustrates the first part of a high-level flowchart diagram of the recovery operation of the present invention according to a preferred embodiment.
Figure 5B:
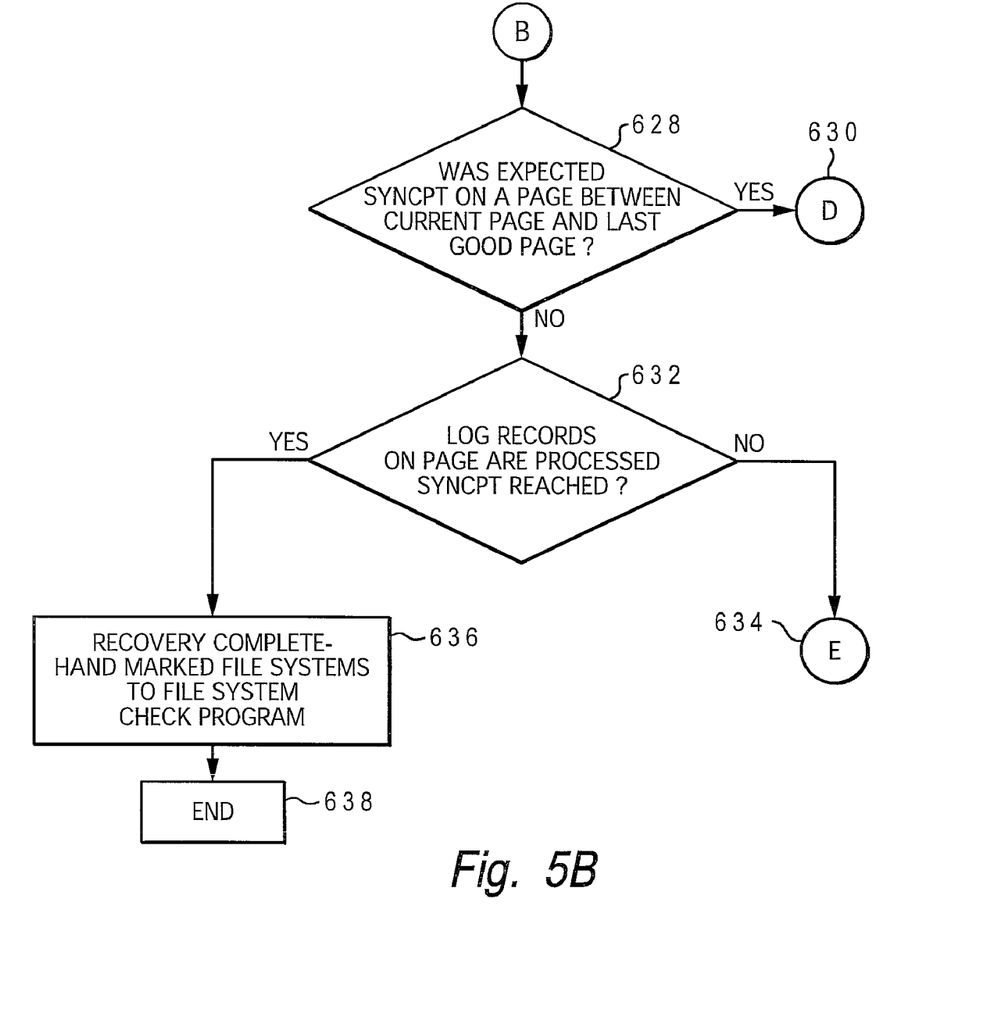
FIG. 5B depicts the second part of a high-level flowchart diagram of the recovery operation of the present invention according to a preferred embodiment.

With reference now to FIG. 5A, there is depicted a high-level flowchart diagram of the recovery operation of one preferred embodiment of the present invention. As illustrated, the process begins at step 600, where journal recovery manager 225 reads several values from superblock 302 in preparation for file system recovery. Superblock 302 is read to determine the number of pages in the log, the active file system list, and the state of the log. The state of the log parameter indicates whether or not the log should be read, as determined by the value of the error count, as compared to the high water mark, as previously discussed.

When a file system is categorized as "active" in superblock 302, this signifies that particular file system is utilizing log 300 for journaling entries. At times, an active file system might be categorized as "marked." This indicates that particular file system encountered errors since the file system was mounted, or brought online to the system. Marked filed systems may need to be handed off to a file system check program to complete the file recovery process. A sync point indicates the last known point in time where the particular associated file system was completely consistent.

The process then continues to step 602, which illustrates a determination made as to whether or not the state of the log, as read from superblock 302, indicates whether the log should be replayed. If the state of the log indicates log 300 should not be replayed, the log is formatted (e.g. initialized, as depicted in FIG. 3A), as illustrated in step 604, and all active and marked file systems are handed to a file system check program (e.g. fsck or Scandisk) to complete the file recovery, as indicated in step 606. After performing the file system check, the process moves to step 607, which illustrates the ending of the procedure.

If the state of the log indicates that log 300 should be replayed, the process continues to step 608, which depicts the last written page in log 300 being found. The last written page is the page with the largest log sequence number value. The process then moves to step 610, which illustrates that the page counter being incremented.

Then, there is a determination made as to whether or not the page counter has reached the number of pages in log 300, as indicated in step 612. If it is determined that the page counter has reached the number of pages in log 300, the process continues to step 614, which depicts that the log has wrapped. Then, the process moves to step 604, and continues to step 606, as previously discussed. If there was a determination that the page counter has not reached the number of pages in log 300, the process continues to step 616, which depicts the current log page being read.

Next, there is a determination made as to whether or not the read of the current log page succeeded, as illustrated in step 618. If it is determined that the read of the current log page did not succeed, all active file systems are marked to hand over to a file system check program, as indicated in step 620. Then, the page number is decremented. If, however, it is determined that the current log page is at the beginning of log 300, the page number is set to the last physical page of log 300, as illustrated in step 622. Next, the process continues to step 622, where the process then returns to step 610, and continues in an iterative fashion. If it is determined that the read did succeed, the process continues to step 624, which depicts a determination made as to whether or not the log sequence number in head 308 matches the log sequence number in tail 310. If it is determined that the log sequence number in head 308 matches the log sequence number in tail 310, the process then proceeds to step 626, which depicts a determination made as to whether or not the log sequence number of page read of log 300 is one less than the previously read log sequence number. If not, the procedure continues to previous step 620 and proceeds in an iterative fashion. If it is determined that the log sequence number in head 308 does not match the log sequence number in tail 310, the procedure continues to prior step 620 and proceeds in an iterative fashion. If it is determined that the log sequence number on page read of log 300 is one less than the previous read log sequence number, the process continues to step 628 of FIG. 5B, which illustrates a determination made as to whether or not there was an expected sync point (SYNCPT) on a page between the current page and the last good page. If so, the process continues to step 630, which illustrates that the process returns to step 606 and proceeds in an iterative fashion. If it was determined that there was not an expected sync point on a page between the current page and the last good page, the process continues to step 632, which depicts the processing of the log records on the page and a determination made as to whether or not an expected sync point is reached. If an expected sync point is reached, the process continues to step 636, which illustrates the recovery via log 300 being considered complete and all marked file systems are handed to a file system check program for complete recovery. Finally, the process ends, as indicated in step 638. If, however, when the log records are processed, an expected sync point is not reached, the process continues to step 634, which illustrates the return to prior step 622 and continues in an iterative fashion.

While this invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable-type media such as floppy disks or CD-ROMs and transmission-type media such as analog or digital communication links.

What is claimed is:

1. A method in a data processing system for recovering data in a file system in data storage of the data processing system, said method comprising:

the data processing system detecting a request to modify a data block in said file system in the data storage;

in response to detecting said request to modify said data block, the data processing system comparing a log size of a log in the data storage that stores metadata describing data blocks in said file system to a maximum log size, wherein said log includes a plurality of entries ordered by a time each entry among said plurality of entries is written to said log;

in response to determining said log size meets or exceeds said maximum log size, the data processing system writing metadata describing said data block in said file system over an earliest written entry among said plurality of entries in said log;

in response to detecting an error during said writing of said metadata, the data processing system incrementing an error counter;

in response to a request to recover said data in said file system, the data processing system reading said metadata only if said error counter is less than or equal to a predetermined value; and in response to determining said error counter exceeds said predetermined value, the data processing system:
indicating said log should not be replayed;
formatting said log; and
handing over said file system to a file system check program to complete recovery of said file system.

2. The method in claim 1, said writing further comprising:
associating a log sequence number at a beginning of at least one entry in said log;
in response to completely writing said metadata in said at least one entry, associating said log sequence number at an end of said at least one entry;
determining whether or not said log sequence number at said beginning and at said end of said at least one entry match; and
in response to determining said log sequence number at said beginning and at said end of said at least one entry match, indicating said at least one entry is valid for recovering said data in said file system.

3. The method in claim 1, wherein said log includes a synchronization point, said reading further comprises:
reading said metadata only until encountering said synchronization point, wherein said synchronization point indicates a last known point where said file system was consistent.

4. The method in claim 1, wherein said detecting a request to modify a data block in said file system, further comprises:
a kernel, resident in a memory in said data processing system, detecting a request sent via a system call from a program resident in said memory, to modify said data block residing in said file system via a system thread among a plurality of file system threads.

5. A data processing for recovering data in a file system, said data processing system comprising:

at least one processor;
an interconnect coupled to said processor; and
a computer-usable storage medium embodying computer program code, said computer-usable storage medium being coupled to said interconnect, said computer program code comprising instructions executable by said at least one processor and configured for:

detecting a request to modify a data block in said file system;

in response to detecting said request to modify said data block, comparing a log size of a log that stores metadata describing data blocks in said file system to a maximum log size, wherein said log includes a plurality of entries ordered by a time each entry among said plurality of entries is written to said log;

in response to determining said log size meets or exceeds said maximum log size, writing metadata describing said data block in said file system over an earliest written entry among said plurality of entries in said log;

in response to detecting an error during said writing of said metadata, incrementing an error counter;

in response to a request to recover said data in said file system, reading said metadata only if said error counter is less than or equal to a predetermined value; and in response to determining said error counter exceeds said predetermined value,
indicating said log should not be replayed;
formatting said log; and
handing over said file system to a file system check program to complete recovery of said file system.

6. The data processing system in claim 5, wherein instructions are further configured for:
associating a log sequence number at a beginning of at least one entry in said log;
in response to completely writing said metadata in said at least one entry, associating said log sequence number at an end of said at least one entry;
determining whether or not said log sequence number at said beginning and at said end of said at least one entry match; and
in response to determining said log sequence number at said beginning and at said end of said at least one entry match, indicating said at least one entry is valid for recovering said data in said file system.

7. The data processing system in claim 5, wherein said log includes a synchronization point, and wherein said instructions are further configured for:
reading said metadata only until encountering said synchronization point, wherein said synchronization point indicates a last known point where said file system was consistent.

8. The data processing system in claim 5, further comprising:
a kernel, resident in a memory, detecting a request sent via a system call from a program resident in said memory, to modify said data block residing in said file system via a system thread among a plurality of file system threads.

9. A computer-readable storage medium within a data processing system embodying computer program code, said computer program code comprising computer-executable instructions configured for:

detecting a request to modify a data block in said file system;

in response to detecting said request to modify said data block, comparing a log size of a log that stores metadata describing data blocks in said file system to a maximum log size, wherein said log includes a plurality of entries ordered by a time each entry among said plurality of entries is written to said log;

in response to determining said log size meets or exceeds said maximum log size, writing metadata describing said data block in said file system over an earliest written entry among said plurality of entries in said log;

in response to detecting an error during said writing of said metadata, incrementing an error counter;

in response to a request to recover said data in said file system, reading said metadata only if said error counter is less than or equal to a predetermined value; and in response to determining said error counter exceeds said predetermined value,
  indicating said log should not be replayed;
  formatting said log; and
  handing over said file system to a file system check program to complete recovery of said file system.

10. The computer-readable storage medium in claim 9, wherein said computer-executable instructions configured for writing metadata further comprises computer-executable instructions configured for:

associating a log sequence number at a beginning of at least one entry in said log;

associating said log sequence number at an end of said at least one entry, in response to completely writing said metadata in said at least one entry;

determining whether or not said log sequence number at said beginning and at said end of said at least one entry match; and indicating said at least one entry is valid for recovering said data in said file system, in response to determining said log sequence number at said beginning and at said end of said at least one entry match.

11. The computer-readable storage medium in claim 9, wherein said log includes a synchronization point, wherein said computer-executable instructions for reading said metadata further comprises computer-executable instructions configured for:

reading said metadata only until encountering said synchronization point, wherein said synchronization point indicates a last known point where said file system was consistent.

12. The computer-readable storage medium according to claim 9, wherein said embodied computer program code further includes computer-executable instructions configured for:

a kernel, resident in a memory in said data processing system, detecting a request sent via a system call from a program resident in said memory, to modify said data block residing in said file system via a system thread among a plurality of file system threads.

* * * * *